United States Patent
Lee et al.

(10) Patent No.: US 11,772,090 B2
(45) Date of Patent: Oct. 3, 2023

(54) LOW-TEMPERATURE DE-$NO_x$ CATALYST USING CERIA-ALUMINA COMPLEX SUPPORT AND MANUFACTURING METHOD THEREOF

(71) Applicant: KOREA UNIVERSITY RESEARCH AND BUSINESS FOUNDATION, Seoul (KR)

(72) Inventors: Kwan Young Lee, Seoul (KR); Ki Bong Lee, Seoul (KR); Hyun Wook Kim, Seongnam-si (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 298 days.

(21) Appl. No.: 17/002,894

(22) Filed: Aug. 26, 2020

(65) Prior Publication Data

US 2021/0101140 A1 Apr. 8, 2021

(30) Foreign Application Priority Data

Oct. 8, 2019 (KR) .................. 10-2019-0124523
Feb. 10, 2020 (KR) .................. 10-2020-0015847

(51) Int. Cl.

| | | |
|---|---|---|
| *B01J 23/02* | (2006.01) | |
| *B01J 23/42* | (2006.01) | |
| *B01J 23/44* | (2006.01) | |
| *B01J 23/72* | (2006.01) | |
| *B01J 37/03* | (2006.01) | |
| *B01J 37/06* | (2006.01) | |
| *B01J 37/08* | (2006.01) | |
| *B01J 23/46* | (2006.01) | |
| *B01J 21/04* | (2006.01) | |
| *B01J 23/10* | (2006.01) | |

(52) U.S. Cl.
CPC ............. *B01J 37/035* (2013.01); *B01J 23/02* (2013.01); *B01J 23/42* (2013.01); *B01J 23/44* (2013.01); *B01J 23/464* (2013.01); *B01J 23/468* (2013.01); *B01J 23/72* (2013.01); *B01J 37/06* (2013.01); *B01J 37/08* (2013.01); *B01J 21/04* (2013.01); *B01J 23/10* (2013.01)

(58) Field of Classification Search
CPC . B01J 37/035; B01J 37/06; B01J 37/08; B01J 23/02; B01J 23/42; B01J 23/44; B01J 23/464; B01J 23/468; B01J 23/72; B01J 23/10; B01J 21/04
See application file for complete search history.

(56) References Cited

FOREIGN PATENT DOCUMENTS

| | | | |
|---|---|---|---|
| JP | 2003010646 A | * | 1/2003 |
| JP | 4656361 B2 | | 3/2011 |
| JP | 5825221 B2 | | 12/2015 |
| KR | 10-2014-0079233 A | | 6/2014 |
| KR | 10-1438953 B1 | | 9/2014 |
| KR | 10-1621110 B1 | | 5/2016 |

OTHER PUBLICATIONS

Pereda-Ayo et al., Catalysis Today, (2015), v241, p. 133-142.*
Bueno-Lopez et al., Applied Catalysis B: Environmental, (2016), v198 p. 189-199.*

* cited by examiner

*Primary Examiner* — Yong L Chu
(74) *Attorney, Agent, or Firm* — NSIP Law

(57) ABSTRACT

Disclosed are a low-temperature de-$NO_x$ catalyst using a ceria-alumina complex support, and a method of manufacturing the same. According to the present invention, provided is a low-temperature de-$NO_x$ catalyst using a ceria-alumina complex support, manufactured by impregnating noble metal and metal oxides into a ceria-alumina complex support synthesized by treating a ceria precursor and an alumina precursor in a predetermined mass ratio by a co-precipitation method.

6 Claims, 4 Drawing Sheets

LOW-TEMPERATURE DE-NO$_x$ CATALYST USING CERIA-ALUMINA COMPLEX SUPPORT AND MANUFACTURING METHOD THEREOF

CROSS-REFERENCE TO RELATED APPLICATION

This application claims under 35 U.S.C. § 119 the benefit of Korean Patent Application No. 10-2019-0124523, filed on Oct. 8, 2019 and No. 10-2020-0015847, filed on Feb. 10, 2020, the entire contents of which are incorporated herein by reference.

BACKGROUND

(a) Technical Field

The present invention relates to a low-temperature de-NO$_x$ catalyst using a ceria-alumina complex support and a method of manufacturing the same, and more particularly, to an optimum synthesis method of a ceria-alumina complex support used for NO$_x$ removal at a low-temperature of 200° C. or less, and additionally to an optimum synthesis method of a noble metal and metal oxides.

(b) Background Art

In accordance with the application of a high fuel efficiency technology (lean burn engine) for reducing fuel consumption of an automobile, it has been found to be difficult to remove NO$_x$, one of the harmful substances in an exhaust gas.

This is because the amount of generated NO$_x$ increases due to an increase in the amount of injected air during combustion, and moreover, the temperature of the exhaust gas decreases, which is not suitable for conventional catalysts to be activated.

Also, it is important to secure NO$_x$ removal ability in a 'cold-start' condition in order to conform environmental regulation that is gradually being tightened.

In previous studies, the amount of NO$_x$ released in the cold-start condition is larger than that of NO$_x$ released in the normal driving condition. The cold-start condition refers to an initial state right after engine start, and also, to a driving condition in which the temperature of a catalytic converter is insufficient.

In order to solve such a problem, catalysts and adsorption-removal factors capable of efficiently reducing NO$_x$ at a low-temperature, specifically 200° C. or less, have been studied.

Conventional lean NO$_x$ trap (hereinafter referred to as LNT) consists of three parts: a support made of porous materials such as alumina, metal oxides used as NO$_x$ adsorbents such as barium oxide, and noble metal that is responsible for NO$_x$ oxidation or reduction catalyst such as platinum.

In order to enhance NO$_x$ removal efficiency, however, it is important to remove NO$_x$ even at a low-temperature condition, increase an adsorption capacity for NO$_x$ at a low temperature, and lower a desorption temperature.

A low adsorption capacity for NO$_x$ at a low temperature causes frequent NO$_x$ slip below activation temperature of catalyst, and a high desorption temperature is another disadvantage of conventional LNT catalyst, in terms of harsh condition and energy requirement. Thus, the introduction of various kinds of elements improves performance, and among them, the introduction of ceria having an excellent oxygen storage capacity (OSC) helps to oxidize nitrogen monoxide to nitrogen dioxide, thereby increasing NO$_x$ storage performance, and it is also advantageous when reducing stored NO$_x$ due to its redox property.

According to the prior art, ceria was used by additionally supporting on an inorganic support, or was used together by physically mixing with other metal oxides, such as alumina, silica or zirconia having high thermal stability.

Ceria is a metal oxide having a high surface area, and is able to act as a support, but is not suitable for use alone as a support in a catalytic converter of automobiles because it does not have high thermal stability.

According to previous studies on the surface area of ceria depending on the calcination temperature, the surface area was 130 m$^2$/g when calcined at 600° C., and the surface area decreased at higher temperatures, resulting in the surface area of 46 m$^2$/g when calcined at 800° C. [M. Eberhardt et al., Topics in Catalysis 30-31 (2004) 135].

In previous studies, there are cases in which the ceria is additionally impregnated into the inorganic support along with noble metals, barium oxide, etc., but when the ceria is impregnated into the support at a certain amount or more, the textural properties of catalysts deteriorate, thereby adsorption performance of the catalyst reduces.

Related Art Document

[Patent Document] Korean Patent No. 10-1621110

SUMMARY OF THE DISCLOSURE

In order to solve the above-described problems of the prior art, the present invention is to propose a low-temperature de-NO$_x$ catalyst using ceria-alumina complex support capable of complementing the thermal stability of support and enhancing the oxygen storage capacity and redox property of ceria when an inorganic support and ceria are used in combination, and a method of manufacturing the same.

In one general aspect, provided is a low-temperature de-NO$_x$ catalyst using a ceria-alumina complex support, manufactured by impregnating noble metal and metal oxides into the ceria-alumina complex support synthesized by treating a ceria precursor and an alumina precursor in a predetermined mass ratio by a co-precipitation method.

The ceria precursor may include one of cerium chloride (CeCl$_3$), cerium sulfate (Ce(SO$_4$)$_2$), and cerium nitrate hydrate (Ce(NO$_3$)$_3$6H$_2$O).

The alumina precursor may include one of aluminum chloride (AlCl$_3$), aluminum sulfate (Al$_2$(SO$_4$)$_3$), and aluminum nitrate hydrate (Al(NO$_3$)9H$_2$O).

A mass ratio between the ceria precursor and the alumina precursor may be 1:3 to 1:5.

The ceria-alumina complex support may be synthesized by dissolving the alumina precursor, introducing the ceria precursor after a predetermined time has elapsed, and dissolving the ceria precursor again for a predetermined time.

The ceria-alumina complex support may be synthesized by obtaining a precipitate through pH adjustment after the dissolution, stirring, washing, filtering, and calcining the precipitate at a predetermined temperature.

The noble metals may include at least one of platinum, palladium, rhodium, and iridium, and the metal oxides may include oxides containing at least one of magnesium, calcium, strontium, barium, sodium, potassium, rubidium, cesium, iron, and copper.

A precursor of the noble metals may be first impregnated into the ceria-alumina complex support and dried, and a precursor of the metal oxides may be then impregnated and calcined.

The precursor of the noble metals may include $(NH_4)_2PtCl_4$, and the precursor of metal oxides may include copper nitrate hydrate $(Cu(NO_3)_2 \cdot 3H_2O)$ that is a copper oxide precursor and barium acetate $((CH_3COO)_2Ba)$ that is a barium oxide precursor.

A mass ratio between the copper oxide precursor and the barium oxide precursor may be 1:1.

In another general aspect, provided is a method of manufacturing a low-temperature de-$NO_x$ catalyst, the method comprising: dissolving an alumina precursor in distilled water, introducing a ceria precursor after a predetermined time has elapsed, dissolving the ceria precursor again for a predetermined time, obtaining a precipitate through pH adjustment, and drying, washing, filtering, and calcining the precipitate to manufacture a ceria-alumina complex support; impregnating a noble metal precursor into the ceria-alumina complex support; and impregnating one or more metal oxides into the ceria-alumina complex support into which the noble metal is impregnated, using one or more metal oxide precursors through co-impregnation.

According to the present invention, synthesis of ceria and alumina through the co-precipitation method can have a relatively high surface area even at high temperatures, and at the same time, the oxygen storage capacity and redox property of the ceria can be maintained.

Also, according to the present invention, the ceria exists as a support, and thus can avoid deterioration in performance of textural properties through impregnation.

Furthermore, the catalyst, synthesized by additionally co-impregnating the noble metal and metal oxides into the ceria-alumina complex support formed through the co-precipitation method, can increase the adsorption capacity of $NO_x$ and lower the desorption temperature compared to the conventional LNT catalyst.

DETAILED DESCRIPTION

Figure 1:
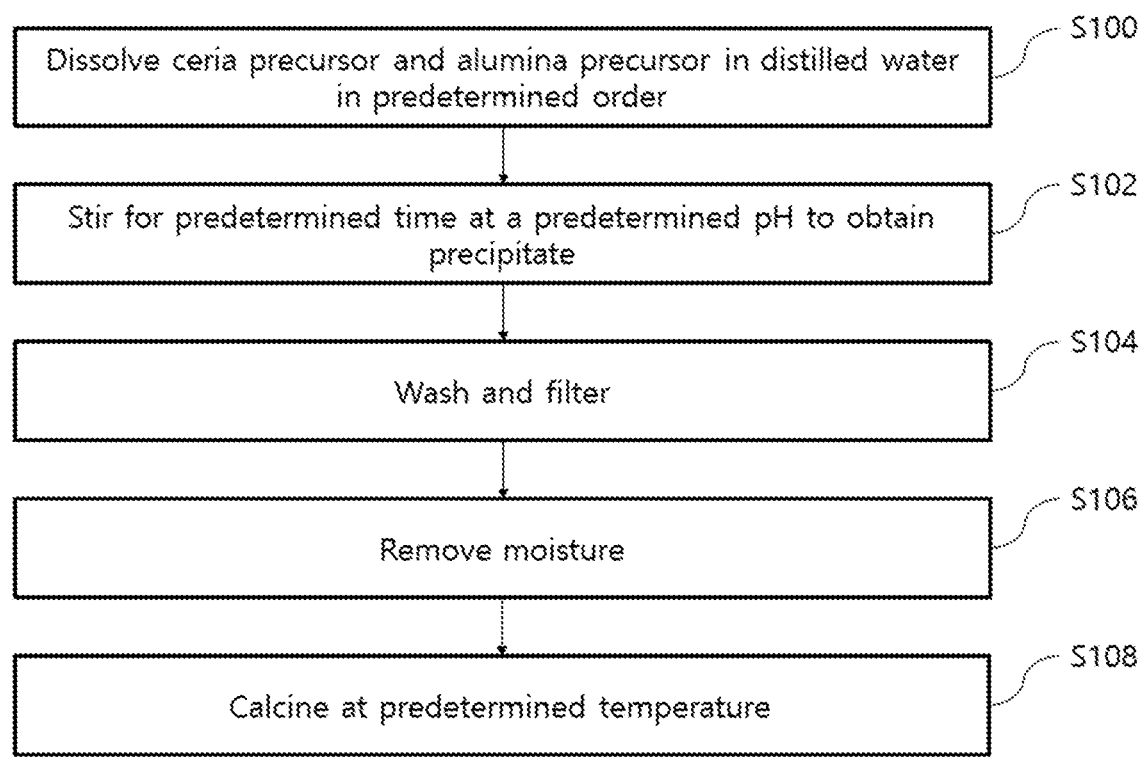
FIG. 1 is a view illustrating a synthesis process of a ceria-alumina complex support according to the embodiment.

The present invention may be modified in various ways and may have various embodiments, and thus specific embodiments will be illustrated in the drawings and described in detail.

However, this is not intended to limit the present invention to specific embodiments, and should be understood to include all modifications, equivalents, and substitutes included in the spirit and scope of the present invention.

According to one preferred embodiment of the present invention, a ceria-alumina complex support is synthesized through a co-precipitation method rather than impregnating ceria into alumina.

The co-precipitation method is a treatment that allows precipitate precursors containing metal ions to be precipitated uniformly at the same time.

FIG. 1 is a view illustrating a synthesis process of a ceria-alumina complex support according to the embodiment.

Referring to FIG. 1, the ceria precursor and the alumina precursor are dissolved in a solvent in a predetermined order (step 100).

As the ceria precursor, cerium chloride $(CeCl_3)$, cerium sulfate $(Ce(SO_4)_2)$, cerium nitrate hydrate $(Ce(NO_3)_3 6H_2O)$, etc. may be used, and cerium nitrate may be preferably used.

As the alumina precursor, aluminum chloride $(AlCl_3)$, aluminum sulfate $(Al_2(SO_4)_3)$, aluminum nitrate hydrate $(Al(NO_3)_3 9H_2O)$, etc. may be used, and aluminum nitrate hydrate may be preferably used.

In step 100, the ceria precursor and the alumina precursor are dissolved in a predetermined mass ratio.

The mass ratio between the ceria precursor and the alumina precursor is a variable that can affect textural properties and catalytic properties.

According to the embodiment, the mass ratio between the alumina precursor and the ceria precursor may be 1:1 to 9:1, preferably 4:1 to 5:1, and more preferably 4:1.

When performing the co-precipitation method, a dissolution order and a dissolution time of the ceria precursor and the alumina precursor introduced into distilled water may be considered as factors that may affect the surface area properties of the complex support.

The ceria precursor may be dissolved first, followed by the alumina precursor, or the alumina precursor may be dissolved first, followed by the ceria precursor, and both precursors may be simultaneously introduced into distilled water.

According to one preferred embodiment of the present invention, a method of dissolving the alumina precursor, introducing the ceria precursor after a predetermined time has elapsed (e.g. after 3 hours), and dissolving the ceria precursor again for a predetermined time, is used.

Table 1 shows BET surface area (m²/g), pore volume (cm³/g), and pore diameter (nm) of $Al_2O_3$ and $CeO_2$ according to the embodiment, respectively.

TABLE 1

| | BET surface area (m²/g) | Pore volume (cm³/g) | Pore diameter (nm) |
|---|---|---|---|
| $Al_2O_3$ | 294 | 0.26 | 5.6 |
| Al1Ce1 | 204 | 0.29 | 4.6 |
| Al2Ce1 | 212 | 0.27 | 5.5 |
| Al4Ce1 | 299 | 0.20 | 5.8 |
| Al9Ce1 | 271 | 0.18 | 5.4 |
| Ce1Al2 | 239 | 0.16 | 3.6 |
| Ce1Al4 | 204 | 0.22 | 4.2 |
| Ce1Al2(co) | 190 | 0.16 | 3.8 |
| $CeO_2$ | 55 | 0.10 | 4.6 |

Referring to Table 1, it can be confirmed that when dissolving the alumina precursor first, followed by the ceria precursor, in the experiment in which the mass ratio between the alumina and the ceria precursor was 1:1, 2:1, 4:1, and 9:1, the BET surface area was the largest in the case where the mass ratio between the alumina and ceria precursor was 4:1. Further, it can be confirmed that in the case where the mass ratio between the alumina and ceria precursor was 4:1, in the precipitation order, the BET surface area in the case where the alumina precursor was dissolved first, followed by the ceria precursor (Al4Ce1), is larger than that of the opposite case (Ce1Al4).

In order to obtain a precipitate from the alumina precursor and ceria precursor, stirring is performed simultaneously with pH adjustment using NaOH (step 102).

In step 102, a pH required to obtain the precipitate from each precursor is determined in the rage of 10.0 to 11.0, and the stirring speed is maintained at 300 rpm.

After the stirring is completed, the precipitate is obtained through a washing process and a filtering process (step 102).

In step 104, even when the washing and filtering processes are performed, stirring is performed at 300 rpm to prevent the filtering speed from being slowed down by the precipitate as much as possible.

After sufficiently washing, a precipitate is obtained through the filtering process without stirring.

The precipitate is dried in an oven at 110° C. for 12 hours to remove contained water (step 106).

Calcination is performed to activate the dried precipitate with the ceria-alumina complex support (step 108).

The calcination temperature for activating the complex support according to the embodiment may be 600° C. and the calcination is performed for 4 hours.

The calcination atmosphere is a factor that can change the textural properties. The flowing gas during calcination may be selected from nitrogen, argon, carbon dioxide, air, etc., and the calcination is preferably performed under an air atmosphere.

Impregnation of Noble Metal and Metal Oxides

Noble metal and metal oxides were impregnated using the ceria-alumina complex support synthesized by the above-described method.

The impregnation of the noble metal and the metal oxides uses continuous impregnation and co-impregnation methods.

As the noble metal, platinum, palladium, rhodium, iridium, etc. may be used, and platinum are preferably used. As the platinum precursor, $(NH_4)_2PtCl_4$ may be used.

The metal oxides was used to store $NO_x$, and magnesium, calcium, strontium, barium, sodium, potassium, rubidium, cesium, iron, copper, etc. may be used, and barium and copper oxide were preferably used.

Table 2 below shows the $NO_2$ adsorption capacity when impregnating platinum and barium, after proceeding in different mass ratios in the order of precipitation of alumina and ceria, when synthesizing the ceria-alumina complex support.

TABLE 2

| | Adsorption capacity (mmol/g) |
|---|---|
| Pt2-Ba20-Al | 0.99 |
| Pt2-Ba20-Al2Ce1 | 0.83 |
| Pt2-Ba20-Al4Ce1 | 1.04 |
| Pt2-Ba20-Al9Ce1 | 0.90 |

Table 3 shows the adsorption capacity to the $NO_x$ of the catalyst obtained by synthesizing a support with different precipitation ratios between Al and Ce in the same order of precipitation, and then impregnating Pt and Ba corresponding to the LNT catalyst into the support. Referring Table 3, it can be confirmed that when comparing the adsorption capacity for this upon flowing the gas with a composition of 10% $NO_2$/He balance, the adsorption capacity was the highest compared to other mass ratios in the case where the mass ratio between the alumina precursor and the ceria precursor was 4:1.

As the barium oxide precursor and the copper oxide precursor, barium acetate $((CH_3COO)_2Ba)$ and copper nitrate hydrate $(Cu(NO_3)_2 \cdot 3H_2O)$ are used, respectively.

The mass of each precursor is a variable that can affect the catalytic properties, and the noble metal may be adjusted to 0.5, 1, 2 wt %, etc., based on the mass of the total catalyst, and preferably 2 wt %.

The metal oxides may be adjusted to 5, 10, 20 wt %, etc., based on the mass of the total catalyst, and preferably 20 wt %.

The mass ratio between the copper oxide precursor and the barium oxide precursor may be adjusted to 2:1, 1:1, 1:2, etc., and preferably 1:1.

The copper oxide precursor and barium oxide precursor were dispersed in 1.5 mL or 1.2 mL of distilled water together or separately and then impregnated, this order can affect the catalytic properties, and preferably impregnated the platinum precursor first and then continuously the copper oxide precursor and the barium oxide precursor were co-impregnated.

In detail, the platinum precursor was dispersed in 1.5 mL of distilled water, 0.25 ml of distilled water with the platinum precursor dispersed therein was impregnated into 1 g of ceria-alumina complex support, and then dried at 110° C. The same was repeated 6 times, and then drying was performed at 110° C. for 12 hours. Next, the copper oxide precursor and the barium oxide precursor were dispersed in 1.2 mL of distilled water, 0.2 mL of distilled water with the copper oxide precursor and the barium oxide precursor dispersed therein was co-impregnated into 1 g of ceria-alumina complex support, and then dried. The same was repeated 6 times, and then drying was performed at 110° C. for 12 hours.

The catalyst, which was impregnated, was calcined for activation, and the calcination was performed at 600° C. for 2 hours. The calcination atmosphere is a variable that can affect the catalytic properties, and nitrogen, argon, carbon dioxide, air, etc. may be selected, and the calcination is preferably performed under an air atmosphere.

Evaluation of Catalytic Properties

In order to compare the activity of the catalysts, temperature-programmed reduction using hydrogen ($H_2$-TPR) was performed.

The names of the catalysts were divided into three parts: noble metal, metal oxides, and support, and when two or more of the metal oxides part and the support part were made, each element was simultaneously marked using a dash (-).

Figure 2:
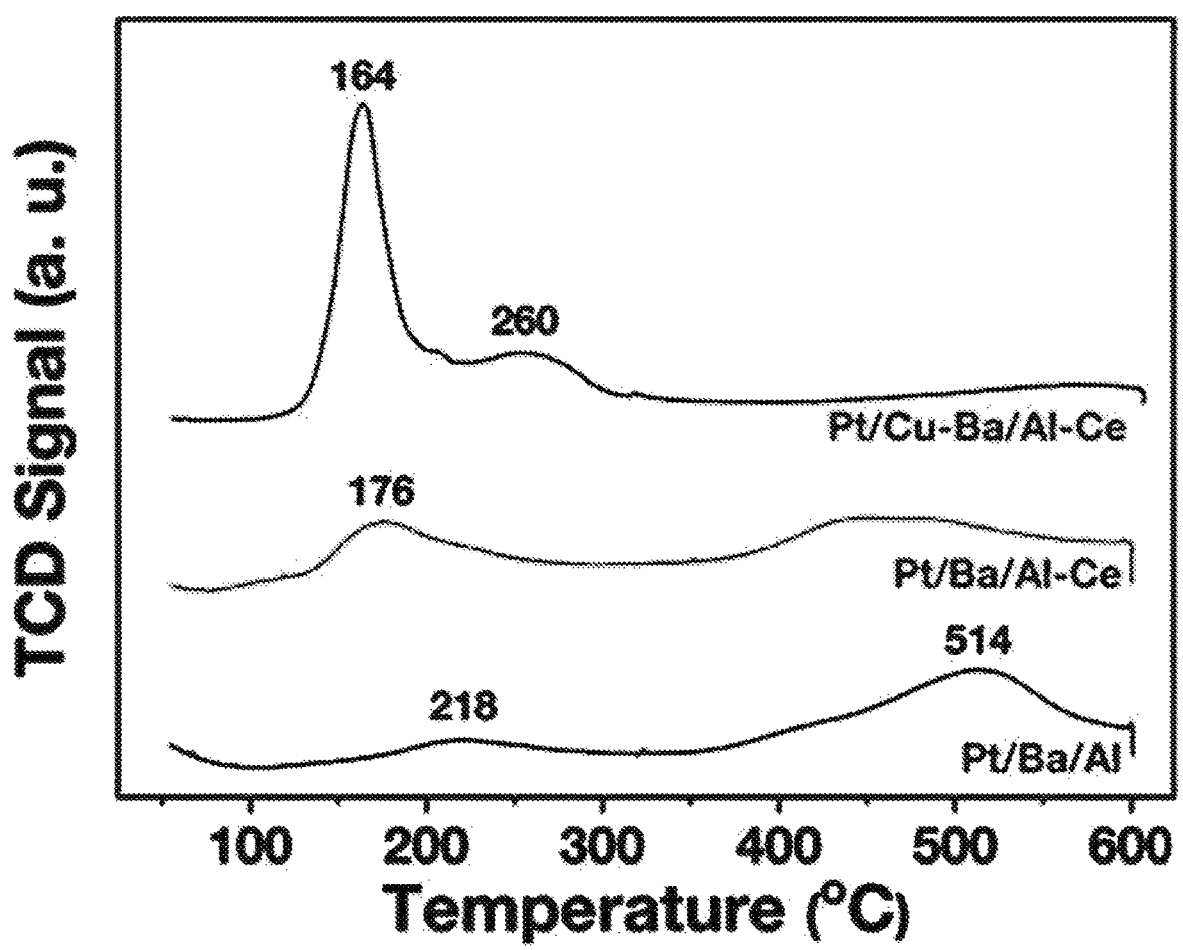
FIG. 2 is a result of $H_2$-TPR experiments from 50° C. to 600° C.

FIG. 2 illustrates a result of $H_2$-TPR experiments from 50° C. to 600° C. It could be confirmed that an initial reduction peak of a Pt/Ba/Al catalyst corresponding to the conventional LNT catalyst located at 218° C., a higher reduction peak located at 514° C., and the degree of reduction at a higher temperature was greater.

It can be seen that the initial reduction at 176° C. and higher reduction at around 450° C. occurred for the Pt/Ba/Al—Ce catalyst where the support was replaced with a ceria-alumina complex support. Compared to the Pt/Ba/Al catalyst, the amount of reduction at a low temperature increased and the reduction started at lower temperature.

Finally, from $H_2$-TPR of the Pt/Cu—Ba/Al—Ce catalyst, the Pt/Cu—Ba/Al—Ce catalyst had the lowest reduction temperature at a low temperature and the largest size among the three types of catalysts. Thus, it can be seen that the catalyst having the highest activity at a low temperature was the Pt/Cu—Ba/Al—Ce catalyst.

In particular, it can be confirmed that the Pt/Cu—Ba/Al—Ce catalyst exhibits the highest degree of reduction at about 200° C., which is highly utilized to remove $NO_x$ at a low temperature of 200° C. or less.

In order to measure the textural properties of the support and the catalyst, nitrogen adsorption analysis was performed and the results are shown in Table 3.

TABLE 3

| Support and catalyst | Specific surface area (m²/g) | Pore volume (cm³/g) |
|---|---|---|
| Al | 294 | 0.25 |
| Al—Ce | 289 | 0.23 |
| Pt/Ba/Al | 197 | 0.11 |
| Pt/Cu—Ba/Al—Ce | 163 | 0.16 |

Referring to Table 3, there was no significant difference in specific surface area and pore volume between the alumina support and the ceria-alumina complex support. However, after impregnation with noble metal and metal oxides, both catalysts have significantly reduced specific surface area and pore volume. This shows that the textural properties are reduced as impregnation occurs on the support.

Figure 3:
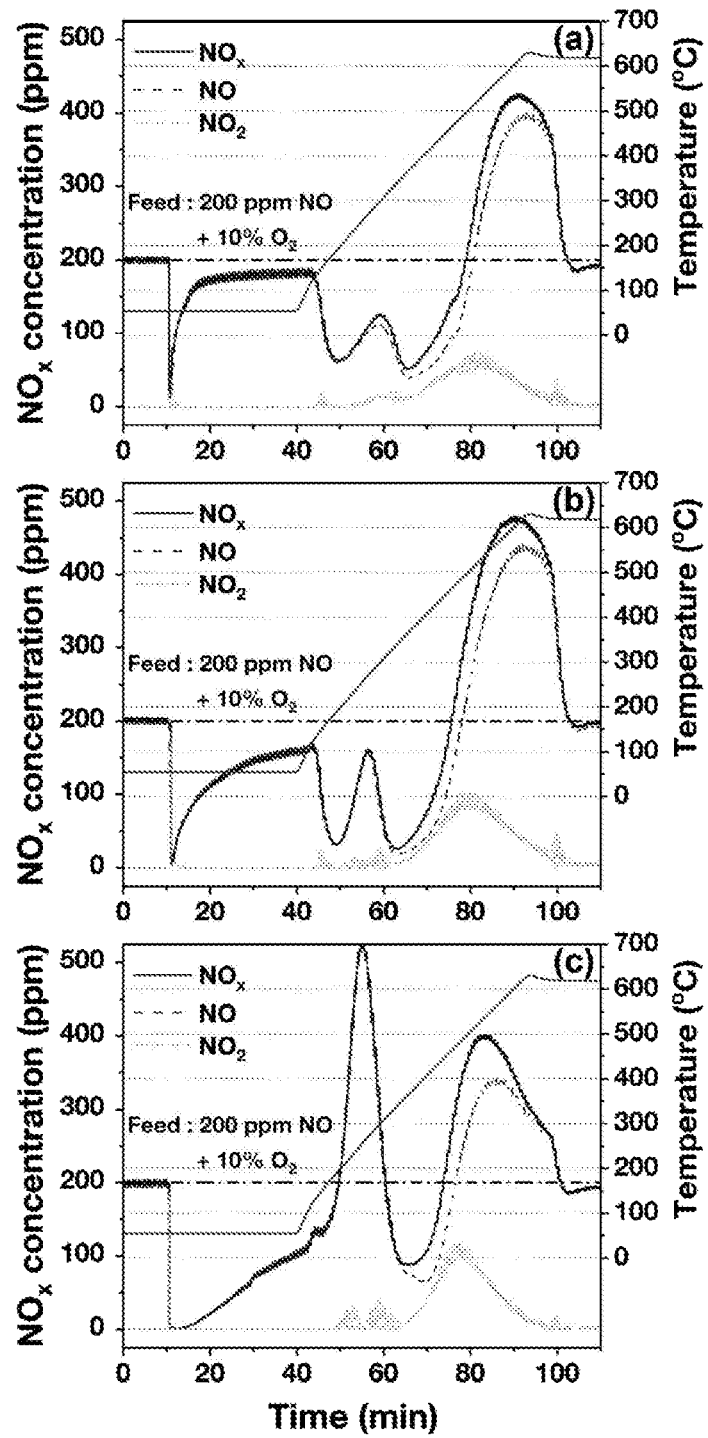
FIG. 3 illustrates a change in gas composition under conditions where nitrogen monoxide and oxygen coexist from 50° C. to 600° C. in order to evaluate NO oxidation capacity.

FIG. 3 illustrate a change in gas composition under conditions where nitrogen monoxide and oxygen coexist from 50° C. to 600° C. in order to evaluate NO oxidation capacity.

FIGS. 3a to 3c illustrate that the change in gas composition through elevated temperature after nitrogen monoxide adsorption for Pt/Ba/Al, Pt/Ba/Al—Ce, and Pt/Cu—Ba/Al—Ce, respectively.

Barium oxide has a higher affinity for nitrogen dioxide than nitrogen monoxide, so the oxidation capacity of catalyst for nitrogen monoxide at a low temperature is important for increasing adsorption capacity.

The experiments were carried out in the same manner for each catalyst by raising the temperature from 50° C. while flowing 200 ppm of a NO/10% $O_2$/$N_2$ atmosphere gas for 30 minutes to 600° C. while flowing a gas of the same composition.

Referring to FIG. 3, first, a comparison of the nitrogen monoxide adsorption section (10 minutes to 40 minutes) at 50° C. shows that adsorption was hardly achieved through rapid recovery of the concentration of $NO_x$ in Pt/Ba/Al.

Next, in the Pt/Ba/Al—Ce catalyst, a little more adsorption has occurred because the output concentration of $NO_x$ increased to the input value slowly compared to Pt/Ba/Al. This is probably because of the high oxygen storage capacity and redox property of the ceria existing as a support. Finally, the Pt/Cu—Ba/Al—Ce catalyst showed that the concentration of $NO_x$ was the most slowly recovered during the nitrogen monoxide adsorption section (10 to 40 minutes) compared to the previous two catalysts, indicating that adsorption occurred the most.

The comparison of the results analyzing the oxidation degree of nitrogen monoxide through an elevated temperature after adsorption for 30 minutes, showed that Pt/Ba/Al corresponding to the conventional LNT catalyst and Pt/Ba/Al—Ce were almost the same trend, the adsorption capacity was higher in Pt/Ba/Al—Ce, and a temperature range in which the adsorption capacity increased due to oxidation was similar. However, Pt/Cu—Ba/Al—Ce showed a different tendency from the previous two catalysts, with noticeable difference in the nitrogen monoxide slip phenomenon from 200° C. or more. This is attributed to that nitrogen monoxide weakly bound to copper oxide failed off as the temperature increased, and after nitrogen monoxide slip, additional adsorption due to NO oxidation was observed in the higher temperature region, and desorption occurred at temperatures of 450° C. or more.

When Cu was co-impregnated with Ba, the temperature at which desorption occurred lowered by about 100° C. compared to Pt/Ba/Al or Pt/Ba/Al—Ce.

Evaluation of Adsorption Performance

The adsorption capacity of the Pt/Ba/Al catalyst (conventional LNT catalyst) and the Pt/Cu—Ba/Al—Ce catalyst was compared depending on the temperature.

The adsorption capacity was compared through $NO_x$ storage efficiency (hereinafter referred to as NSE, the difference between inflow $NO_x$ and outflow $NO_x$, compared to inflow $NO_x$), and the equation for calculating $NO_x$ storage efficiency is as follows.

$$NOx \text{ storage efficiency } (NSE) = \frac{\int NOx_{inlet} - \int NOx_{outlet}}{\int NOx_{inlet}} \quad \text{[Equation 1]}$$

Figure 4:
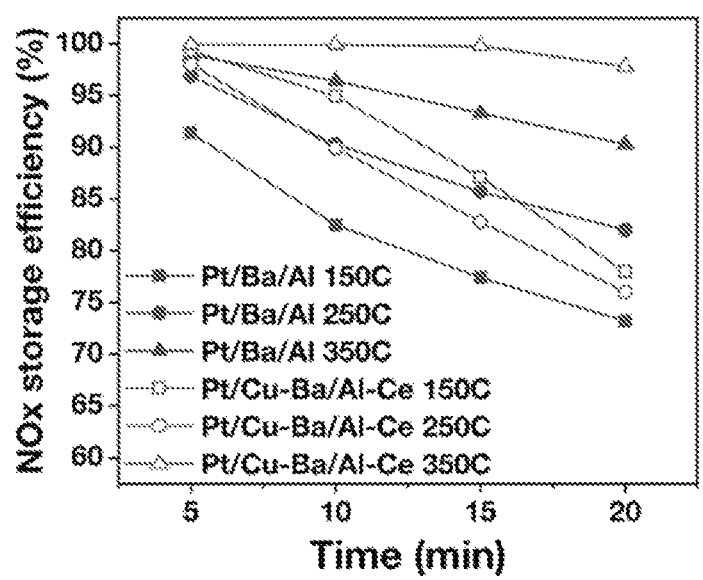
FIG. 4 is a view illustrating comparison of $NO_x$ storage efficiency depending on the temperature of two catalysts through the predetermined calculation method (equation 1).

FIG. 4 is a view illustrating a comparison of $NO_x$ storage efficiency (NSE) for two catalysts depending on temperature through the above calculation method.

Referring to FIG. 4, first, for the Pt/Ba/Al catalyst, it can be confirmed that NSE was significantly lower at low temperature and increased as temperature increased. Next, for the Pt/Cu—Ba/Al—Ce catalyst, it can be seen that the NSE was significantly increased at low temperature, especially in the initial state, and decreased over time.

At 250° C., the NSE decreased to a small extent due to the previous $NO_x$ slip phenomenon, and at 350° C., the NSE was the highest, indicating that there was almost no $NO_x$ released until about 15 minutes. Based on these results, it can be confirmed that the Pt/Cu—Ba/Al—Ce catalyst was advantageous for $NO_x$ adsorption at low temperature, and that the NSE was the best at a high-temperature region of 350° C.

The above-described embodiments of the present invention are disclosed for purposes of illustration, and various modifications, changes, and additions may be made to those skilled in the art without departing from the spirit and scope of the present invention, and those modifications, changes and additions should be regarded as belonging to the following claims.

The invention claimed is:

1. A low-temperature de-$NO_x$ catalyst using a ceria-alumina complex support, manufactured by impregnating noble metal and metal oxides into the ceria-alumina complex support synthesized by treating a ceria precursor and an alumina precursor in a predetermined mass ratio by a co-precipitation method,
   wherein the ceria precursor includes one of cerium chloride ($CeCl_3$), cerium sulfate ($Ce(SO_4)_2$), and cerium nitrate hydrate ($Ce(NO_3)_3 6H_2O$),
   wherein the alumina precursor includes one of aluminum chloride ($AlCl_3$), aluminum sulfate ($Al_2(SO_4)_3$), and aluminum nitrate hydrate ($Al(NO_3)_9 H_2O$),
   wherein the predetermined mass ratio between the alumina precursor and the ceria precursor is 3.5:1 to 4.5:1,
   wherein the noble metal includes at least one of platinum, palladium, rhodium, and iridium, and the metal oxides include an oxide containing at least one of magnesium, calcium, strontium, barium, sodium, potassium, rubidium, cesium, iron, and copper, wherein a precursor of the noble metal is first impregnated into the ceria-alumina complex support and dried, and precursors of the metal oxides are then impregnated and calcined, and wherein a mass of the noble metal is 0.5 to 2 weight percent based on a total mass of the catalyst, and a mass of the metal oxides is 5 to 20 weight percent based on the total mass of the catalyst.

2. The low-temperature de-$NO_x$ catalyst using a ceria-alumina complex support according to claim 1, wherein the ceria-alumina complex support is synthesized by dissolving the alumina precursor, introducing the ceria precursor after a predetermined time has elapsed, and dissolving the ceria precursor again for a predetermined time.

3. The low-temperature de-$NO_x$ catalyst using a ceria-alumina complex support according to claim 2, wherein the ceria-alumina complex support is synthesized by obtaining a precipitate through pH adjustment after the dissolution, and stirring, washing, filtering, and calcining the precipitation at a predetermined temperature.

4. The low-temperature de-$NO_x$ catalyst using a ceria-alumina complex support according to claim 1, wherein the precursor of the noble metal includes $(NH_4)_2PtCl_4$, and the precursor of the metal oxides includes copper nitrate hydrate $(Cu(NO_3)_2 \cdot 3H_2O)$ which is a copper oxide precursor and barium acetate $((CH_3COO)_2Ba)$ which is a barium oxide precursor.

5. The low-temperature de-$NO_x$ catalyst using a ceria-alumina complex support according to claim 4, wherein a mass ratio between the copper oxide precursor and the barium oxide precursor is 1:1.

6. A method of manufacturing the low-temperature de-$NO_x$ catalyst of claim 1, the method comprising:

dissolving an alumina precursor in distilled water, introducing a ceria precursor after a predetermined time has elapsed, dissolving the ceria precursor again for a predetermined time, obtaining a precipitate through pH adjustment, and drying, washing, filtering, and calcining the precipitate to manufacture a ceria-alumina complex support;

impregnating a noble metal precursor into the ceria-alumina complex support; and impregnating one or more metals into the ceria-alumina complex support into which the noble metal is impregnated, using one or more metal oxide precursors through co-impregnation.

\* \* \* \* \*